United States Patent
Zeng et al.

(10) Patent No.: US 12,401,024 B2
(45) Date of Patent: Aug. 26, 2025

(54) NEGATIVE ELECTRODE ACTIVE MATERIAL, NEGATIVE ELECTRODE PLATE AND BATTERY

(71) Applicant: CONTEMPORARY AMPEREX TECHNOLOGY (HONG KONG) LIMITED, Hong Kong (CN)

(72) Inventors: Yuqun Zeng, Ningde (CN); Chengdu Liang, Ningde (CN); Yuzhen Zhao, Ningde (CN); Qisen Huang, Ningde (CN); Yingjie Guan, Ningde (CN); Yan Wen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 838 days.

(21) Appl. No.: 16/723,578

(22) Filed: Dec. 20, 2019

(65) Prior Publication Data

US 2020/0212439 A1 Jul. 2, 2020

(30) Foreign Application Priority Data

Dec. 29, 2018 (CN) .......................... 201811640052.X

(51) Int. Cl.
*H01M 4/131* (2010.01)
*H01M 4/134* (2010.01)
(Continued)

(52) U.S. Cl.
CPC ........... *H01M 4/386* (2013.01); *H01M 4/134* (2013.01); *H01M 2004/027* (2013.01)

(58) Field of Classification Search
CPC ................. H01M 4/386; H01M 4/134; H01M 2004/027; H01M 10/052;
(Continued)

(56) References Cited

U.S. PATENT DOCUMENTS

2013/0045419 A1* 2/2013 Chun ................... C01B 33/158
423/325

FOREIGN PATENT DOCUMENTS

CN 102956877 A 3/2013
CN 104241652 A 12/2014
(Continued)

OTHER PUBLICATIONS

Contemporary Amperex Technology Co., Limited, International Search Report and Written Opinion, PCT/CN2019/125307, Mar. 17, 2020, 11 pgs.
(Continued)

*Primary Examiner* — Cynthia K Walls
(74) *Attorney, Agent, or Firm* — XSENSUS LLP

(57) ABSTRACT

The present disclosure provides a negative electrode active material, a battery and a device. The negative electrode active material comprises a first silicon oxide and a second silicon oxide, wherein, a ratio of a particle diameter Dn10 of the first silicon oxide to a particle diameter Dn10 of the second silicon oxide is 8~25, the particle diameter Dn10 of the first silicon oxide is 1.0 μm~5.0 μm, the particle diameter Dn10 of the second silicon oxide is 0.05 μm~0.50 μm. By selecting two kinds of silicon oxides with specific ranges of Dn10 to match with each other, the present disclosure controls the thickness rebound of negative electrode plate, ensures good electrical contact between the negative electrode active material particles, in turn is beneficial to improve the cycle stability and the cycle-life of the battery.

19 Claims, 2 Drawing Sheets

(51) Int. Cl.
*H01M 4/38* (2006.01)
*H01M 4/02* (2006.01)

(58) Field of Classification Search
CPC ....... H01M 2004/021; H01M 2220/20; H01M 4/364; H01M 4/483; H01M 10/0525; H01M 10/054; Y02E 60/10
See application file for complete search history.

(56) References Cited

FOREIGN PATENT DOCUMENTS

| | | |
|---|---|---|
| CN | 10802836 A | 5/2018 |
| EP | 2559660 A1 | 2/2013 |
| JP | 2009205950 A | 10/2009 |
| WO | WO2018097212 A | 5/2018 |

OTHER PUBLICATIONS

Contemporary Amperex Technology Co., Limited, Extended European Search Report, EP19219845.5, Apr. 7, 2020, 8 pgs.
Contemporary Amperex Technology Co., Limited, Intention to Grant, EP19219845.5, Oct. 10, 2022, 5 pgs.
Ningder Age New Energy Technology Co. Ltd., First Search, CN201811640052.X, Nov. 26, 2020, 2 pgs.
Ningder Age New Energy Technology Co. Ltd., Second Office Action, CN201811640052.X, May 31, 2021, 16 pgs.
Ningder Age New Energy Technology Co. Ltd., Third Office Action, CN201811640052.X, Aug. 11, 2021, 18 pgs.
Ningder Age New Energy Technology Co. Ltd., Notification to Grant Patent Right for Invention, CN201811640052.X, Nov. 16, 2021, 3 pgs.

* cited by examiner

NEGATIVE ELECTRODE ACTIVE MATERIAL, NEGATIVE ELECTRODE PLATE AND BATTERY

CROSS-REFERENCE TO RELATED APPLICATIONS

The present application claims priority to Chinese patent application No. CN201811640052.X, filed on Dec. 29, 2018, which is incorporated herein by reference in its entirety.

TECHNICAL FIELD

The present disclosure relates to the field of battery, and more specifically relates to a negative electrode active material, a battery and a device.

BACKGROUND

Recent years, due to the higher requirements for energy density in the industry of electric vehicle, a lot of research has been carried out on negative electrode active materials having high capacity. Silicon is valued because it has a theoretical capacity pergram higher than graphite by more than 10 times, but there exists severe volume effect for silicon, which results in huge volume expansion in the process of charging. Therefore, the negative electrode plate prepared by silicon as negative electrode active material has larger thickness rebound and the porosity of the negative electrode plate is higher in the use of battery, so the structure of the negative electrode plate are gradually transformed from the initial dense state into the loose porous state, and the conductive network of the negative electrode plate is damaged, the electrical contact between the negative electrode active material particles, become poor, which seriously influence on the cycle stability and the cycle-life of the battery.

SUMMARY

In view of the problems existing in the background, an object of the present disclosure is to provide a negative electrode active material, a battery and a device, which can control the thickness rebound of the negative electrode plate and ensure good electrical contact between the negative electrode active material particles, and improve the cycle stability and the cycle-life of battery.

In order to achieve the above object, in a first aspect of the present disclosure, the present disclosure provides a negative electrode active material, which comprises a first silicon oxide and a second silicon oxide, wherein, a ratio of a particle diameter Dn10 of the first silicon oxide to a particle diameter Dn10 of the second silicon oxide is 8~25, the particle diameter Dn10 of the first silicon oxide is 1.0 μm~5.0 μm, the particle diameter Dn10 of the second silicon oxide is 0.05 μm~0.50 μm.

In a second aspect of the present disclosure, the present disclosure provides a battery, which comprises a negative electrode active material according to the first aspect of the present disclosure.

In a third aspect of the present disclosure, the present disclosure provides a device, which comprises a battery according to the second aspect of the present disclosure.

The present disclosure at least has the following beneficial effects: by selecting the two kinds of the silicon oxides with the specific ranges of Dn10 to match with each other, the present disclosure controls the thickness rebound of negative electrode plate, and ensures good electrical contact between the negative electrode active material particles, further is beneficial to improve the cycle stability and the cycle-life of the battery. The device of the present disclosure has at least the same advantages as the battery because the device comprises the battery.

DETAILED DESCRIPTION

Figure 1:
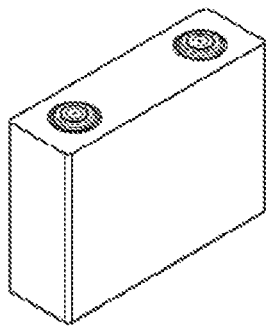
FIG. 1 is a schematic view of an embodiment of a battery.

Hereinafter a negative electrode active material, a battery and a device according to the present disclosure are described in detail.

Firstly, a negative electrode active material according to a first aspect of the present disclosure is described.

The negative electrode active material according to the first aspect of the present disclosure comprises a first silicon oxide and a second silicon oxide, wherein, a ratio of a particle diameter Dn10 of the first silicon oxide to a particle diameter Dn10 of the second silicon oxide is 8~25, and the particle diameter Dn10 of the first silicon oxide is 1.0 μm~5.0 μm, and the particle diameter Dn10 of the second silicon oxide is 0.05 μm~0.50 μm. It should be noted that a Dn10 represents a particle diameter corresponding to cumulative quantity percentage of a material(such as the negative electrode active material, the first silicon oxide or the second silicon oxide) reaching 10%.

The particle diameter Dn10 of the first silicon oxide should not be too large, otherwise a content of fine particles in the negative electrode active material is too low, which is beneficial to suppress the thickness rebound of the negative electrode plate. Here, a lower limit of the particle diameter Dn10 of the first silicon oxide may be selected from any one of 1.0 μm, 1.1 μm, 1.2 μm, 1.3 μm, 1.4 μm, 1.5 μm, 1.6 μm, 1.7 μm, 1.8 μm, 1.9 μm and 2.0 μm, an upper limit of the particle diameter Dn10 of the first silicon oxide may be selected from any one of 5.0 μm, 4.8 μm, 4.5 μm, 4.2 μm, 4.0 μm, 3.8 μm, 3.6 μm, 3.4 μm, 3.2 μm, 3.0 μm, 2.8 μm, 2.6 μm, 2.4 μm and 2.0 μm. Preferably, the particle diameter Dn10 of the first silicon oxide is 1.7 μm~4.5 μm.

The particle diameter Dn10 of the second silicon oxide should not be too small, otherwise there would be a large amount of fine particles in the prepared negative electrode plate, which tends to result in increase in the consumption of the electrolyte solution and deteriorate cycle performance and service life of the battery. Here, a lower limit of the particle diameter Dn10 of the second silicon oxide may be selected from any one of 0.05 μm, 0.06 μm, 0.07 μm, 0.08 μm, 0.09 μm, 0.10 μm, 0.11 μm, 0.12 μm, 0.13 μm, 0.14 μm and 0.15 μm, an upper limit of the particle diameter Dn10 of the second silicon oxide may be selected from any one of 0.50 μm, 0.48 μm, 0.45 μm, 0.40 μm, 0.38 μm, 0.35 μm, 0.32 μm, 0.30 μm, 0.28 μm, 0.26 μm, 0.24 μm, 0.22 μm, 0.20 μm and 0.18 μm. Preferably, the particle diameter Dn10 of the second silicon oxide is 0.10 μm~0.35 μm.

A lower limit of the ratio of the particle diameter Dn10 of the first silicon oxide to the particle diameter Dn10 of the second silicon oxide may be selected from any one of 8, 9, 10, 11, 12, 13, 14, 15 and 16, an upper limit of the ratio of the particle diameter Dn10 of the first silicon oxide to the particle diameter Dn10 of the second silicon oxide may be selected from any one of 25, 24, 23, 22, 21, 20, 19, 18, 17, 16 and 15. Preferably, the ratio of the particle diameter Dn10 of the first silicon oxide to the particle diameter Dn10 of the second silicon oxide is 10~20.

In the negative electrode active material of the present disclosure, mixing the two kinds of the silicon oxides with the specific ranges of Dn10 can effectively reduce the thickness rebound of the negative electrode plate and maintain good electrical contact between the negative electrode active material particles, which is beneficial to improve the cycle stability and the cycle-life of the battery. Possible reason is that: from the perspective of the negative electrode active material powder, the mixing of the first silicon oxide and the second silicon oxide with different ranges of Dn10 to match with each other can significantly improve the compaction density of the negative electrode active material powder, the higher the compaction density is, the higher the degree of matching between the negative electrode active material powders is, more beneficially the compaction density of the negative electrode plate is improved, and the better the electrical contact between the negative electrode active material particles is; from the perspective of the negative electrode plate, in the process of preparing the negative electrode plate, the second silicon oxide with a smaller Dn10 has smaller particle diameter and larger quantity, the second silicon oxide will fill in the gap between particles of the first silicon oxide with larger Dn10, which can not only improve compaction density of the negative electrode plate, but also reduce the probability of larger vacancies in the negative electrode plate caused by the volume expansion of the first silicon oxide with larger Dn10 during the use of battery, that is, the thickness rebound and the porosity of the negative electrode plate can be reduced, therefore the cycle stability and the cycle-life of battery can be improved.

If the ratio of the particle diameter Dn10 of the first silicon oxide to the particle diameter Dn10 of the second silicon oxide is too low, and the quantity advantage of the second silicon oxide with smaller Dn10 is almost lost, and it is difficult to fully fill the gap between particles of the first silicon oxide with larger Dn10, so the thickness rebound of the negative electrode plate is larger in the use of the battery. If the ratio of the particle diameter Dn10 of the first silicon oxide to the particle diameter Dn10 of the second silicon oxide is too high, the prepared negative electrode plate will contain a large amount of fine particles, which easily results in increase in the consumption of the electrolyte solution and deteriorate cycle performance and service life of the battery.

Dn10 represents a particle diameter corresponding to the cumulative quantity percentage reaching 10%, that is, the quantity of particles which particle diameters are smaller than the particle diameter corresponding to Dn10 accounts for 10% of the total quantity of all the particles, which can more accurately and intuitively reflect the content of fine particles. The volume particle diameter represents a percentage of a total volume of particles, which each is smaller than a certain value, to a total volume of all the particles. For a powder having a wide particle diameter distribution range (for example, the negative electrode active material), the volume percentage of a powder having fine particles to the negative active electrode material powder is negligible, but the powder having fine particles has a very large influence on the volume expansion of the negative electrode active material powder (especially the silicon-containing negative electrode active material powder), therefore, it is rougher to use the conventional volume particle diameter to characterize the content of fine particles in the negative electrode active material powder, while it is more accurate and intuitive of quantitive particle diameter to characterize the content of fine particles in the negative electrode active material powder, which is beneficial to reasonably control the thickness rebound of the negative electrode plate.

In the negative electrode active material of the present disclosure, preferably, a particle diameter Dn10 of the negative electrode active material is 0.10 μm~0.50 μm. Here, a lower limit of the particle diameter Dn10 of the negative electrode active material may be selected from any one of 0.10 μm, 0.11 μm, 0.12 μm, 0.13 μm, 0.14 μm, 0.15 μm, 0.16 μm, 0.17 μm, 0.18 μm, 0.19 μm and 0.20 μm, an upper limit of the particle diameter Dn10 of the negative electrode active material may be selected from any one of 0.50 μm, 0.48 μm, 0.45 μm, 0.42 μm, 0.40 μm, 0.38 μm, 0.35 μm, 0.32 μm, 0.30 μm, 0.28 μm, 0.26 μm, 0.24 μm, 0.22 μm and 0.20 μm. More preferably, the particle diameter Dn10 of the negative electrode active material is 0.15 μm~0.36 μm.

In the negative electrode active material of the present disclosure, by selecting the two kinds of the silicon oxides with the specific ranges of Dn10 to match with each other, the increase of the thickness rebound and the porosity of the negative electrode plate can be well controlled, which maintains good electrical contact between the negative electrode active material particles, on this basis, if a particle diameter distribution width of the two kinds of the silicon oxides is further controlled reasonably, it is also beneficial to promote the degree of matching between the negative electrode active material particles and maintain a good electrode plate structure, thereby the cycle stability and the cycle-life of the battery can be further improved. Here, the particle diameter distribution width is represented by (Dn90-Dn10)/Dn50. Dn10, Dn50 and Dn90 represent particle diameters corresponding to the cumulative quantity percentages reaching 10%, 50% and 90%, respectively.

Preferably, the first silicon oxide has a particle diameter distribution width of 0.8~1.2. A lower limit of the particle diameter distribution width of the first silicon oxide may be selected from any one of 0.80, 0.82, 0.84, 0.86, 0.88, 0.90, 0.92, 0.94, 0.96, 0.98 and 1.00, an upper limit of the particle diameter distribution width of the first silicon oxide may be selected from any one of 1.20, 1.18, 1.16, 1.14, 1.12, 1.10, 1.08, 1.06, 1.04, 1.02 and 1.00. More preferably, the first silicon oxide has a particle diameter distribution width of 0.9~1.1.

The wider the particle diameter distribution of the second silicon oxide is, the better the quantity advantage of the second silicon oxide is, however, the prepared negative electrode plate as above will contains a large amount of fine particles at the same time, which results in increase in the consumption of the electrolyte solution; the narrower the particle diameter distribution of the second silicon oxide is, the worse the quantity advantage of the second silicon oxide is and the worse the effect of filling of the second silicon oxide as filler filled in the gap between the particles of the first silicon oxide. Preferably, the second silicon oxide has a particle diameter distribution width of 1.0~1.6. A lower limit of the particle diameter distribution width of the second silicon oxide may be selected from any one of 1.00, 1.02, 1.04, 1.06, 1.08, 1.10, 1.12, 1.14, 1.16, 1.18, 1.20, 1.22, 1.24, 1.26, 1.28 and 1.30, an upper limit of the particle diameter distribution width of the second silicon oxide may be selected from any one of 1.60, 1.58, 1.56, 1.54, 1.52, 1.50, 1.48, 1.46, 1.44, 1.42, 1.40, 1.38, 1.36, 1.34, 1.32 and 1.30. More preferably, the second silicon oxide has a particle diameter distribution width of 1.1~1.5.

Preferably, the negative electrode active material has a particle diameter distribution width of 1.0~1.5. A lower limit of the particle diameter distribution width of the negative electrode active material may be selected from any one of 1.00, 1.02, 1.04, 1.06, 1.08, 1.10, 1.12, 1.14, 1.16, 1.18, 1.20, 1.22 and 1.25, an upper limit of the particle diameter distribution width of the negative electrode active material may be selected from any one of 1.50, 1.48, 1.46, 1.44, 1.42, 1.40, 1.38, 1.36, 1.34, 1.32, 1.30, 1.28 and 1.25. More preferably, the negative electrode active material has particle diameter distribution width of 1.1~1.4.

In the negative electrode active material of the present disclosure, by selecting the two kinds of the silicon oxides with the specific ranges of Dn10 to match with each other, the increase of the thickness rebound and the porosity of the negative electrode plate can be well controlled, which maintains good electrical contact between the negative electrode active material particles, on this basis, if average volume particle diameters of the two kinds of the silicon oxides are further controlled reasonably, it is also beneficial to promote the deintercalation and intercalation of the active ions in the negative electrode active material, thereby the cycle stability and the cycle-life of the battery could be further improved. Here, the average volume particle diameter is represented by Dv50, and Dv50 represents a particle diameter corresponding to the cumulative volume percentage of reaching 50%.

Preferably, a ratio of the particle diameter Dv50 of the first silicon oxide to the particle diameter Dv50 of the second silicon oxide is 1.0~8.0. Here, a lower limit of the ratio of the particle diameter Dv50 of the first silicon oxide to the particle diameter Dv50 of the second silicon oxide may be selected from any one of 1.0, 1.1, 1.2, 1.3, 1.5, 1.6, 1.7, 1.8, 1.9, 2.0, 2.1, 2.2, 2.3, 2.4 and 2.5, an upper limit of the ratio of the particle diameter Dv50 of the first silicon oxide to the particle diameter Dv50 of the second silicon oxide may be selected from any one of 8.0, 7.6, 7.2, 6.8, 6.4, 6.0, 5.6, 5.2, 4.8, 4.4, 4.0, 3.6, 3.2, 2.8, 2.4 and 2.0. More preferably, the ratio of the particle diameter Dv50 of the first silicon oxide to the particle diameter Dv50 of the second silicon oxide is 1.5~7.2.

Preferably, the particle diameter Dv50 of the first silicon oxide is 3.0 µm~15.0 µm. Here, a lower limit of the particle diameter Dv50 of the first silicon oxide may be selected from any one of 3.0 µm, 3.2 µm, 3.4 µm, 3.6 µm, 3.8 µm, 4.0 µm, 4.2 µm, 4.4 µm, 4.6 µm, 4.8 µm, 5.0 µm, 5.2 µm, 5.4 µm, 5.6 µm, 5.8 µm and 6.0 µm, an upper limit of the particle diameter Dv50 of the first silicon oxide may be selected from any one of 15.0 µm, 14.5 µm, 14.0 µm, 13.5 µm, 13.0 µm, 12.5 µm, 12.0 µm, 11.5 µm, 11.0 µm, 10.5 µm, 10.0 µm, 9.5 µm, 9.0 µm, 8.5 µm, 8.0 µm, 7.5 µm, 7.0 µm, 6.5 µm and 6.0 µm. More preferably, the particle diameter Dv50 of the first silicon oxide is 4.4 µm~11.0 µm.

Preferably, the particle diameter Dv50 of the second silicon oxide is 0.4 µm~4.0 µm. Here, a lower limit of the particle diameter Dv50 of the second silicon oxide may be selected from any one of 0.4 µm, 0.5 µm, 0.6 µm, 0.7 µm, 0.8 µm, 0.9 µm, 1.0 µm, 1.1 µm, 1.2 µm, 1.3 µm, 1.4 µm, 1.5 µm, 1.6 µm, 1.7 µm, 1.8 µm, 1.9 µm and 2.0 µm, an upper limit of the particle diameter Dv50 of the second silicon oxide may be selected from any one of 4.0 µm, 3.9 µm, 3.8 µm, 3.7 µm, 3.6 µm, 3.5 µm, 3.4 µm, 3.3 µm, 3.2 µm, 3.1 µm, 3.0 µm, 2.9 µm, 2.8 µm, 2.7 µm, 2.6 µm, 2.5 µm, 2.4 µm, 2.3 µm, 2.2 µm, 2.1 µm and 2.0 µm. More preferably, the particle diameter Dv50 of the second silicon oxide is 0.9 µm~3.5 µm.

Preferably, the particle diameter Dv50 of the negative electrode active material is 3.5 µm~10.5 µm. Here, a lower limit of the particle diameter Dv50 of the negative electrode active material may be selected from any one of 3.5 µm, 4.0 µm, 4.5 µm, 5.0 µm, 5.5 µm, 6.0 µm, 6.5 µm and 7.0 µm, an upper limit of the particle diameter Dv50 of the negative electrode active material may be selected from any one of 10.5 µm, 10.0 µm, 9.5 µm, 9.0 µm, 8.5 µm, 8.0 µm, 7.5 µm, 7.0 µm and 6.5 µm. More preferably, the particle diameter Dv50 of the negative electrode active material is 4.0 µm~8.5 µm.

In the negative electrode active material of the present disclosure, further, by reasonably adjusting a specific surface area of the first silicon oxide and a specific surface area of the second silicon oxide, the probability of side reaction of the first silicon oxide and the second silicon oxide with the electrolyte solution could also be significantly reduced.

Preferably, a ratio of the specific surface area of the first silicon oxide to the specific surface area of the second silicon oxide is 1:(1.5~13.0); more preferably, the ratio of the specific surface area of the first silicon oxide to the specific surface area of the second silicon oxide is 1:(1.8~10.0).

Preferably, the specific surface area of the first silicon oxide is 0.4 m$^2$/g~3.2 m$^2$/g. Here, a lower limit of the specific surface area of the first silicon oxide may be selected from any one of 0.4 m$^2$/g, 0.5 m$^2$/g~0.6 m$^2$/g, 0.7 m$^2$/g, 0.8 m$^2$/g, 0.9 m$^2$/g, 1.0 m$^2$/g, 1.1 m$^2$/g, 1.2 m$^2$/g, 1.3 m$^2$/g, 1.4 m$^2$/g, 1.5 m$^2$/g, 1.6 m$^2$/g, 1.7 m$^2$/g and 1.8 m$^2$/g, an upper limit of the specific surface area of the first silicon oxide may be selected from any one of 3.2 m$^2$/g, 3.1 m$^2$/g, 3.0 m$^2$/g, 2.9 m$^2$/g, 2.8 m$^2$/g, 2.7 m$^2$/g, 2.6 m$^2$/g, 2.5 m$^2$/g, 2.4 m$^2$/g, 2.3 m$^2$/g, 2.2 m$^2$/g, 2.1 m$^2$/g, 2.0 m$^2$/g, 1.9 m$^2$/g and 1.8 m$^2$/g. More preferably, the specific surface area of the first silicon oxide is 0.8 m$^2$/g~2.5 m$^2$/g.

Preferably, the surface area of the second silicon oxide specific is 4.6 m$^2$/g~12.5 m$^2$/g. Here, a lower limit of specific surface area of the second silicon oxide may be selected from any one of 4.6 m$^2$/g, 4.8 m$^2$/g, 5.0 m$^2$/g, 5.2 m$^2$/g, 5.5 m$^2$/g, 6.0 m$^2$/g, 6.5 m$^2$/g, 7.0 m$^2$/g, 7.5 m$^2$/g, 8.0 m$^2$/g, 8.5 m$^2$/g and 9.0 m$^2$/g, an upper limit of specific surface area of the second silicon oxide may be selected from any one of 12.5 m$^2$/g, 12.0 m$^2$/g, 11.5 m$^2$/g, 11.0 m$^2$/g, 10.5 m$^2$/g, 10.0 m$^2$/g, 9.5 m$^2$/g, 9.0 m$^2$/g, 8.5 m$^2$/g and 8.0 m$^2$/g. More preferably, the specific surface area of the second silicon oxide is 5.0 m$^2$/g~10.0 m$^2$/g.

Preferably, a specific surface area of the negative electrode active material is 1.8 m$^2$/g~5.9 m$^2$/g. Here, a lower limit of the specific surface area of the negative electrode active material may be selected from any one of 1.8 m$^2$/g, 2.0 m$^2$/g, 2.2 m$^2$/g, 2.4 m$^2$/g, 2.6 m$^2$/g, 2.8 m$^2$/g, 3.0 m$^2$/g, 3.2 m$^2$/g and 3.5 m$^2$/g, an upper limit of a specific surface area of the negative electrode active material may be selected from the group consisting of 5.9 m$^2$/g, 5.6 m$^2$/g, 5.4 m$^2$/g, 5.2 m$^2$/g, 5.0 m$^2$/g, 4.8 m$^2$/g, 4.5 m$^2$/g, 4.0 m$^2$/g and 3.5 m$^2$/g. More preferably, the specific surface area of the negative electrode active material is 2.4 m$^2$/g~5.2 m$^2$/g.

In the negative electrode active material of the present disclosure, when the negative electrode active material has smaller particle diameter, it usually has a larger specific surface area and consumes more electrolyte solution and active ions in the use of battery, therefore, preferably the amount of smaller particles to be added in the negative electrode active material is also within a controlled range.

Preferably, a weight ratio of the first silicon oxide to the second silicon oxide is (60%~90%):(40%~10%); more preferably, the weight ratio of the first silicon oxide to the second silicon oxide is (75%~90%):(25%~10%).

In the negative electrode active material of the present disclosure, preferably, the negative electrode active material has a compaction density of 0.8 g/cm$^3$~2.0 g/cm$^3$ under a test condition of a pressure of 5 tons; more preferably, the negative electrode active material has a compaction density of 1.1 g/cm$^3$~1.7 g/cm$^3$ under a test condition of the pressure of 5 tons.

In the negative electrode active material of the present disclosure, preferably, the negative electrode active material further comprises a coating coated on a surface of at least one of the first silicon oxide and the second silicon oxide. The coating preferably may be one or more selected from a group consisting of carbon material, metal and metallic oxide.

Here, the carbon material preferably is one or more selected from a group consisting of natural graphite, artificial graphite, conductive carbon black, superconductive carbon black, acetylene black, ketjen black, amorphous carbon, coke, meso-carbon micro bead and carbon fibre; the metal preferably is one or more selected from a group consisting of Al, Ti, Fe, Ni, Cu, Zn, Ag, Sn and Mg; the metallic oxide preferably is one or more selected from a group consisting of the oxides in which the metal is selected from a group consisting of Al, Ti, Fe, Ni, Cu, Zn, Ag, Sn and Mg.

In the negative electrode active material of the present disclosure, preferably, the first silicon oxide and/or the second silicon oxide may be lithium predoped silicon oxide.

In the negative electrode active material of the present disclosure, a formula of the negative electrode active material is SiOx, $0<x\leq2$.

In the negative electrode active material of the present disclosure, the negative electrode active material may be obtained by a classification method, which may be air flow classification or screen classification.

In the negative electrode active material of the present disclosure, the particle diameters of the first silicon oxide, the second silicon oxide and the negative electrode active material may be measured by laser diffraction method, according to "Particle size analysis—Laser diffraction methods GB/T19077-2016", the quantitive particle diameter distribution and the volume particle diameter distribution can be measured; the specific surface areas of the first silicon oxide, the second silicon oxide and the negative electrode active material can be measured by the BET method.

Next the negative electrode plate according to the present disclosure is described.

The negative electrode plate according to the present disclosure comprises a negative electrode current collector and a negative electrode film, the negative electrode film is provided on at least one surface of the negative electrode current collector and comprises the negative electrode active material according to the first aspect of the present disclosure.

In the negative electrode plate of the present disclosure, the negative electrode film may be provided on one surface of the negative electrode current collector or provided on two surfaces of the negative electrode current collector.

In the negative electrode plate of the present disclosure, in addition to the negative electrode active material according to the first aspect of the present disclosure, the negative film may further comprise other negative electrode active material, for example, the carbon material. Preferably, the carbon material is one or more selected from a group consisting of graphite, soft carbon, hard carbon, meso-carbon micro bead, carbon fibre and carbon nanotube.

In the negative electrode plate of the present disclosure, the negative electrode film may further comprise a conductive agent and a binder, here the type and the content of the conductive agent and the binder are not specifically limited, and may be selected according to the actual needs.

In the negative electrode plate of the present disclosure, the type of the negative electrode current collector is also not specifically limited, and may be selected according to the actual needs.

Further the battery according to the second aspect of the present disclosure is described.

The battery of the present disclosure comprises a positive electrode plate, a negative electrode plate, a separator and an electrolyte and the like. Here, the negative electrode plate comprises a negative electrode current collector and a negative electrode film, the negative electrode film is provided on at least one surface of the negative electrode current collector and comprises the negative electrode active material according to the first aspect of the present disclosure, the negative electrode film may be provided on one surface of the negative electrode current collector or provided on two surfaces of the negative electrode current collector. In addition to the negative active electrode material according to the first aspect of the present disclosure, the negative electrode film may further comprise other negative electrode active material, for example, the carbon material. Preferably, the carbon material is one or more selected from a group consisting of graphite, soft carbon, hard carbon, meso-carbon micro bead, carbon fibre and carbon nanotube. The negative electrode film may further comprise a conductive agent and a binder, here the type and the content of the conductive agent and the binder are not specifically limited, and may be selected according to the actual needs. The type of the negative current collector is also not specifically limited, and may be selected according to the actual needs.

In the battery of the present disclosure, the positive electrode plate may comprise a positive electrode current collector and a positive electrode film, the positive electrode film is provided on at least one surface of the positive electrode current collector and comprises a positive electrode active material, the positive electrode film may be provided on one surface of the positive electrode current collector or provided on two surfaces of the positive electrode current collector. The positive electrode film may further comprise a conductive agent and a binder, here, the type and the content of the conductive agent and the binder are not specifically limited, and may be selected according to the actual needs.

It should be noted that, the battery of the second aspect of the present disclosure may be a lithium-ion battery, a sodium-ion battery and any other batteries using the negative electrode active material according to the first aspect of the present disclosure.

When the battery is a lithium-ion battery: the positive electrode active material may be selected from a group consisting of lithium cobalt oxide, lithium nickel oxide, lithium manganese oxide, lithium nickel manganese oxide, lithium nickel cobalt manganese oxide, lithium nickel cobalt aluminum oxide, and olivine-type lithium-containing phosphate and the like, however, the present disclosure is not limited to these materials, other conventionally known materials which can be used as a positive electrode active material of the lithium-ion battery can also be used. These positive electrode active material may be used alone or in combination of two or more. Preferably, the positive electrode active material may be one or more selected from a group consisting of $LiCoO_2$, $LiNiO_2$, $LiMnO_2$, $LiMn_2O_4$, $LiNi_{1/3}Co_{1/3}Mn_{1/3}O_2$ (NCM333), $LiNi_{0.5}Co_{0.2}Mn_{0.3}O_2$ (NCM523), $LiNi_{0.6}Co_{0.2}Mn_{0.2}O_2$ (NCM622), $LiNi_{0.8}Co_{0.1}Mn_{0.1}O_2$ (NCM811), $LiNi_{0.85}Co_{0.15}Al_{0.05}O_2$, $LiFePO_4$ (LFP) and $LiMnPO_4$.

When the battery is a sodium-ion battery: the positive electrode active material may be selected from a group consisting of transition metal oxide $Na_xMO_2$ (M is transition metal, and preferably, may be one or more selected from a group consisting of Mn, Fe, Ni, Co, V, Cu and Cr, $0<x\le1$), polyanion-type materials (phosphate-type, fluorophosphate-type, pyrophosphate-type, sulfate-type), prussian blue material and the like, however, the present disclosure is not limited to these materials, other conventionally known materials which can be used as a positive electrode active material of sodium-ion battery can also be used. These positive electrode active material may be used alone or in combination of two or more. Preferably, the positive electrode active material may be one or more selected from a group consisting of $NaFeO_2$, $NaCoO_2$, $NaCrO_2$, $NaMnO_2$, $NaNiO_2$, $NaNi_{1/2}Ti_{1/2}O_2$, $NaNi_{1/2}Mn_{1/2}O_2$, $Na_{2/3}Fe_{1/3}Mn_{2/3}O_2$, $NaNi_{1/3}Co_{1/3}Mn_{1/3}O_2$, $NaFePO_4$, $NaMnPO_4$, $NaCoPO_4$, prussian blue materials, a material with a general formula of $A_aM_b(PO_4)_cO_xY_{3-x}$ (where, A is one or more selected from a group consisting of $H^+$, $Li^+$, $Na^+$, $K^+$ and $NH^{4+}$, M is transition metal cation and preferably is one or more selected from a group consisting of V, Ti, Mn, Fe, Co, Ni, Cu and Zn, Y is halogenide anion and preferably is one or more selected from a group consisting of F, Cl and Br, $0<a\le4$, $0<b\le2$, $1<c\le3$, $0\le x\le2$).

In the battery of the present disclosure, the separator is provided between the positive electrode plate and the negative electrode plate to serve as separation function. Here, the type of the separator is not specifically limited, which may be any separator materials used in existing battery, for example, polyethylene, polypropylene, polyvinylidene fluoride and multilayer composite films thereof, but it is not limited to these.

In the battery of the present disclosure, the type of the electrolyte is not specifically limited, which may be a liquid electrolyte (also referred to as an electrolyte solution) or a solid electrolyte. Preferably, the electrolyte uses a liquid electrolyte. Here, the liquid electrolyte may comprise an electrolyte salt and an organic solvent, the type of the electrolyte salt and the organic solvent are not specifically limited, and may be selected according to the actual needs. The electrolyte may further comprise an additive, the type of the additive is not specifically limited, which may be a negative film-forming additive, also a positive film-forming additive, and an additive improving the certain performance of the battery, for example, an additive improving the overcharge performance of the battery, an additive improving the high temperature performance of the battery, an additive improving the low temperature performance of the battery and the like.

In some embodiments, a battery may comprise a case for packaging the positive electrode plate, the negative electrode plate and the electrolyte. As an example, the positive electrode plate, the negative electrode plate and the separator may be laminated to form a laminated structure electrode assembly or may be wound to form a wound structure electrode assembly, and the electrode assembly is packaged in the case; the electrolyte may be an electrolyte solution, and the electrode assembly is immersed in the electrolyte solution. The electrode assembly of the battery may be one or multiple in number, which can be adjusted according to demand.

In some embodiments, the case of the battery may be a flexible case, such as a pouch case. The material of the flexible case may be plastic, for example, the material can be selected one or more from polypropylene (PP), polybutylene terephthalate (PBT), polybutylene succinate (PBS) and the like. The case of the battery may also be a rigid case, such as an aluminum case and so on.

There is no specific limitation on the shape of the battery of the present disclosure, and the shape may be cylinder, prismatic or any other shape. The battery 5 having a prismatic structure as an example is illustrated in FIG. 1.

In some embodiments, the batteries may be assembled into a battery module, and the number of the batteries included in the battery module may be multiple, and the specific number may be adjusted according to application and capacity of the battery module.

Figure 2:
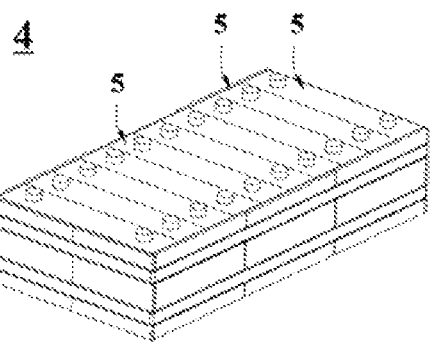
FIG. 2 is a schematic view of an embodiment of a battery module.

The battery module 4 as an example is illustrated in FIG. 2. Referring to FIG. 2, in the battery module 4, a plurality of batteries 5 may be sequentially arranged along a length direction of the battery module 4. Of course, the plurality of batteries 5 may also be arranged in any other way. Further, the plurality of batteries 5 may be fixed by a fastener.

Preferably, the battery module 4 may further comprise a shell having a receiving space in which the plurality of batteries 5 are received.

In some embodiments, the battery module may also be assembled into a battery pack, and the number of the battery modules contained in the battery pack may be adjusted according to application and capacity of the battery pack.

Figure 3:
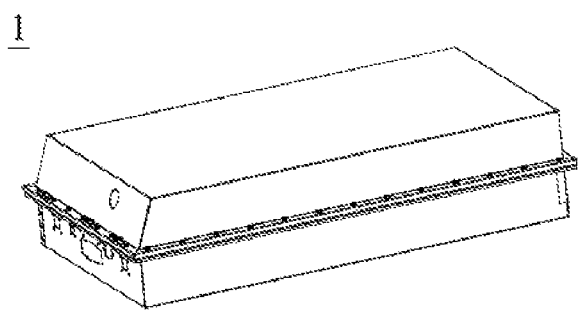
FIG. 3 is a schematic view of an embodiment of a battery pack.
Figure 4:
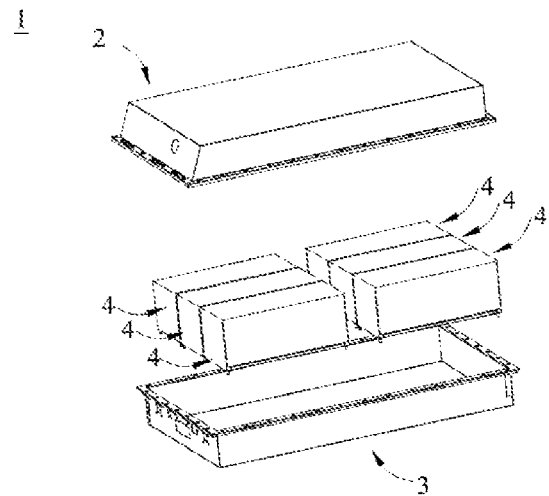
FIG. 4 is an exploded view of FIG. 3.

The battery module 4 as an example is illustrated in FIG. 3 and FIG. 4. Referring to FIG. 3 and FIG. 4, the battery pack 1 may comprise a battery box and a plurality of battery modules 4 provided in the battery box. The battery box comprise an upper box body 2 and a lower box body 3, and the upper box body 2 can cover the lower box body 3 to form an enclosed space receiving the battery. The plurality of battery modules 4 may be arranged in the battery box in any ways.

A Device According to a Third Aspect of the Present Disclosure is Described

In the third aspect of the present disclosure, the present disclosure provides a device, which comprises the battery according to the second aspect of the present disclosure. The battery may be used as a power source of the device. The battery may also used as an energy storage unit of the device. The device comprises, but not limited to, mobile devices (such as mobile phone, laptop, etc.), electric vehicles (such as pure electric vehicle, hybrid electric vehicle, plug-in hybrid electric vehicle, electric bicycle, electric scooter, electric golf cart, electric truck, etc.), electric trains, ships and satellites, energy storage systems, etc.

The battery, the battery module or the battery pack may be selected and be provided in the device according to the needs of the device.

Figure 5:
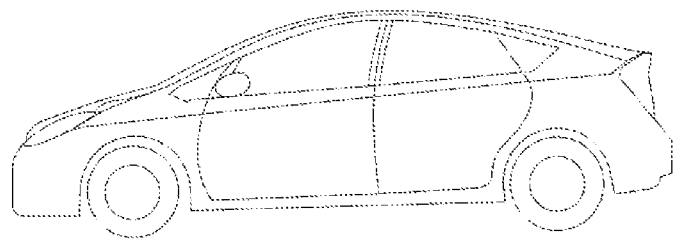
FIG. 5 is a schematic view of an embodiment of a device using the battery as a power source.
The reference numerals are represented as follows:
1 battery pack
2 upper box body
3 lower box body
4 battery module
5 battery

The device as an example is illustrated in FIG. 5. The device is a pure electric vehicle, a hybrid electric vehicle or a plug-in hybrid electric vehicle. A battery pack or battery module can be used in order to meet the device's requirements for high power and high energy density of the battery.

For another example, the device may be a mobile phone, a laptop, etc. The device is generally required to be thin and light, thus a battery may be used as a power source.

Hereafter the present disclosure will be described in detail in combination with examples. It should be noted that, the examples described in the present disclosure are only used for explaining the present disclosure, and are not intended to limit the present disclosure. In the following specific examples of the present disclosure, only the example in which the battery is a lithium-ion battery is shown, however, the present disclosure is not limited thereto.

Batteries of examples 1-14 and comparative examples 1-4 were all prepared in accordance with the following preparation method.

(1) Preparation of a Positive Electrode Plate

NCM811 (positive electrode active material), Super P (conductive agent), polyvinylidene fluoride (PVDF, binder) according to a mass ratio of 96.8:2.2:1 were mixed with N-methylpyrrolidone (NMP, solvent), which then became homogeneous under stirring via a vacuum mixer, a positive electrode slurry was obtained then the positive electrode slurry was uniformly coated on an aluminum foil (positive electrode current collector), then the aluminum foil coated with the positive electrode slurry was dried under room temperature, then the aluminum foil was transferred to an oven to be dried, which was followed by cold pressing and plate cutting, and finally a positive electrode plate was obtained.

(2) Preparation of a Negative Electrode Plate

Negative electrode active material (see table 1), Super P (conductive agent), carboxymethyl cellulose sodium solution (CMC, thickening agent), styrene-butadiene rubber (SBR, binder) according to a mass ratio of 80:10:5:5 were mixed with deionized water (solvent), which then became homogeneous under stirring via a vacuum mixer, a negative electrode slurry was obtained; then the negative electrode slurry was uniformly coated on a copper foil (negative current collector), then the copper foil was transferred to an oven to be dried, which was followed by cold pressing and plate cutting, and finally a negative electrode plate was obtained.

(3) Preparation of an Electrolyte Solution

Ethylene carbonate (EC), ethyl methyl carbonate (EMC) and diethyl carbonate (DEC) according to a volume ratio of 1:1:1 were mixed to obtain an organic solvent, then, the fully dried lithium salt $LiPF_6$ is dissolved in the mixed organic solvent to prepare an electrolyte solution having a concentration of 1 mol/L.

(4) Preparation of a Separator

Polyethylene film was selected as the separator.

(5) Preparation of a Battery

The above positive electrode plate, the separator and the negative electrode plate were laminated in order, the separator was positioned between the positive electrode plate and the negative electrode plate so as to separate the positive electrode plate from the negative electrode plate, then the positive electrode plate, the separator and the negative electrode plate were wound together to from an electrode assembly; then the electrode assembly was put into a case, then the electrolyte solution was injected after drying, which was followed by vacuum packaging, standby, formation, shaping and the like, and finally a battery was obtained.

TABLE 1

Parameters of the negative electrode active material of examples 1-14 and comparative examples 1-14

| | first silicon oxide | | | | second silicon oxide | | | | |
|---|---|---|---|---|---|---|---|---|---|
| | Dn10 (μm) | Dv50 (μm) | (Dn90 − Dn10)/ Dn50 | specific surface area (m²/g) | Dn10 (μm) | Dv50 (pμm) | (Dn90 − Dn10)/ Dn50 | specific surface area (m²/g) | weight ratio |
| Example 1 | 2.2 | 7.3 | 1.10 | 1.2 | 0.27 | 2.4 | 1.53 | 7.2 | 80%:20% |
| Example 2 | 2.6 | 6.0 | 1.08 | 1.3 | 0.27 | 2.4 | 1.43 | 7.2 | 80%:20% |
| Example 3 | 2.2 | 7.3 | 1.07 | 1.2 | 0.19 | 1.7 | 1.37 | 9.4 | 80%:20% |
| Example 4 | 3.1 | 6.9 | 1.06 | 1.2 | 0.24 | 3.2 | 1.21 | 7.0 | 80%:20% |
| Example 5 | 3.5 | 9.0 | 1.04 | 1.1 | 0.22 | 2.6 | 1.19 | 7.6 | 80%:20% |
| Example 6 | 4.2 | 8.7 | 1.01 | 1.0 | 0.22 | 2.6 | 1.16 | 7.6 | 80%:20% |
| Example 7 | 4.2 | 8.7 | 0.89 | 1.0 | 0.19 | 1.7 | 1.05 | 9.4 | 80%:20% |
| Example 8 | 3.5 | 9.0 | 1.04 | 1.1 | 0.22 | 2.6 | 1.19 | 7.6 | 95%:5% |
| Example 9 | 3.5 | 9.0 | 1.04 | 1.1 | 0.22 | 2.6 | 1.19 | 7.6 | 90%:10% |
| Example 10 | 3.5 | 9.0 | 1.04 | 1.1 | 0.22 | 2.6 | 1.19 | 7.6 | 85%:15% |
| Example 11 | 3.5 | 9.0 | 1.04 | 1.1 | 0.22 | 2.6 | 1.19 | 7.6 | 80%:20% |
| Example 12 | 3.5 | 9.0 | 1.04 | 1.1 | 0.22 | 2.6 | 1.19 | 7.6 | 75%:25% |
| Example 13 | 3.5 | 9.0 | 1.04 | 1.1 | 0.22 | 2.6 | 1.19 | 7.6 | 70%:30% |
| Example 14 | 3.5 | 9.0 | 1.04 | 1.1 | 0.22 | 2.6 | 1.19 | 7.6 | 50%:50% |
| Comparative Example 1 | 1.9 | 7.3 | 1.06 | 1.4 | 0.27 | 2.4 | 1.62 | 7.2 | 80%:20% |
| Comparative Example 2 | 3.4 | 8.9 | 0.95 | 1.1 | 0.47 | 2.5 | 1.02 | 6.3 | 80%:20% |
| Comparative Example 3 | 4.2 | 8.7 | 1.23 | 1.0 | 0.16 | 2.7 | 1.16 | 9.1 | 80%:20% |
| Comparative Example 4 | 5.4 | 10.6 | 0.99 | 0.9 | 0.21 | 2.6 | 0.99 | 7.6 | 80%:20% |

Hereafter performance tests on the negative electrode plate and the batteries were described.

(1) The Thickness Rebound Rate of the Negative Electrode Plate:

The thickness of the negative electrode plate after cold pressing and the thickness of the negative electrode plate after 5 cycles at the full discharge state were measured by the 1/10 micrometer and marked as D1 and D2, respectively, and the thickness of the negative current collector was D0, then thickness rebound rate of the negative electrode plate=[(D2−D0)/(D1−D0)−1]×100%.

(2) The Cycle Performance of Batteries:

The prepared battery was fully charged and fully discharged at the current of 1 C, the capacity decay extent was recorded.

TABLE 2

The performance test results of examples 1-14 and comparative examples 1-4

|  | compaction density of the negative electrode active material under pressure of 5 tons (g/cm³) | thickness rebound rate of the negative electrode plate after 5 cycles | capacity retention rate of battery after 200 cycles |
|---|---|---|---|
| Example 1 | 1.4 | 30.08% | 98.31% |
| Example 2 | 1.4 | 29.54% | 98.23% |
| Example 3 | 1.4 | 28.37% | 98.05% |
| Example 4 | 1.5 | 27.89% | 97.95% |
| Example 5 | 1.5 | 26.96% | 97.56% |
| Example 6 | 1.5 | 27.35% | 96.97% |
| Example 7 | 1.4 | 28.03% | 96.72% |
| Example 8 | 1.4 | 28.78% | 98.97% |
| Example 9 | 1.4 | 28.56% | 98.41% |
| Example 10 | 1.4 | 27.94% | 98.04% |
| Example 11 | 1.5 | 26.96% | 97.56% |
| Example 12 | 1.5 | 27.95% | 97.07% |
| Example 13 | 1.5 | 26.71% | 96.63% |
| Example 14 | 1.5 | 28.54% | 96.32% |
| Comparative Example 1 | 1.3 | 31.75% | 95.45% |
| Comparative Example 2 | 1.4 | 32.93% | 95.20% |
| Comparative Example 3 | 1.4 | 33.34% | 94.53% |
| Comparative Example 4 | 1.3 | 31.26% | 95.25% |

It could be seen from test results of table 2 that the batteries prepared in examples 1-14 had both a low thickness rebound rate of the negative electrode plate and long cycle-life.

Although, two kinds of silicon oxides used in comparative examples 1-4 had good volume particle diameter Dv50, the quantitive particle diameter Dn10 of two kinds of silicon oxides did not match with each other ideally, which resulted in the thickness rebound rate of negative electrode plate larger and the cycle performance worse.

The particle diameter Dn10 of the first silicon oxide in comparative example 1 was smaller, resulting in the ratio of the particle diameter Dn10 of the first silicon oxide to the particle diameter Dn10 of the second silicon oxide was too low (less than 8), and the particle diameter distribution of the first silicon oxide was narrow while the particle diameter distribution of the second silicon oxide was wide, the negative electrode plate prepared as above contained a large amount of fine particles, which easily resulted in too more consumption of the electrolyte solution and thus deteriorated the cycle performance of the battery. The particle diameter Dn10 of the second silicon oxide in comparative example 2 was larger, resulting in the ratio of the particle diameter Dn10 of the first silicon oxide to the particle diameter Dn10 of the second silicon oxide was too low (less than 8), and the particle diameter distribution of the second silicon oxide was narrow, thereby the matching of the two kinds of the silicon oxides became worse and the quantity advantage of the second silicon oxide was almost lost, and the effect of filling of the second silicon oxide as filler in the gap between particles of the first silicon oxide with larger Dn10 became worse, so the thickness rebound of the negative electrode plate was large in the use of the battery.

Similarly, the ratio of the particle diameter Dn10 of the first silicon oxide to the particle diameter Dn10 of the second silicon oxide in comparative example 3 and comparative example 4 was too high (greater than 25), the negative electrode plate prepared as above contained a large amount of fine particles, which easily resulted in increase of consumption of the electrolyte solution, and thus deteriorated the cycle performance of the battery, and at the same time the existence of a large amount of fine particles in the negative electrode plate could increase the thickness rebound rate. In addition, the particle diameter distribution of the second silicon oxide in comparative example 3 and comparative example 4 was narrow, thereby the matching of the two kinds of the silicon oxides became worse, and the filling effect of the second silicon oxide with smaller Dn10 as filler in the gap between particles of the first silicon oxide with larger Dn10 was worse, which also increased the thickness rebound rate of the negative electrode plate.

According to the foregoing descriptions and teachings of the present disclosure, a person skilled in the art may also make appropriate variations and modifications to the above embodiments. Therefore, the present disclosure is not limited to the specific embodiments disclosed and described in the above, modifications and variations of the present disclosure will also be fallen within the scope of the appended claims of the present disclosure. Furthermore, although specific terminologies are used in the present disclosure, these terminologies are merely for convenience of description, and are not intended to limit the present disclosure.

What is claimed is:

1. A negative electrode active material, comprising a first silicon oxide and a second silicon oxide;
    a ratio of a particle diameter Dn10 of the first silicon oxide to a particle diameter Dn10 of the second silicon oxide is 8~25, wherein Dn10 represents a particle diameter corresponding to the cumulative quantity percentage reaching 10%;
    the particle diameter Dn10 of the first silicon oxide is 1.0 μm~5.0 μm; and
    the particle diameter Dn10 of the second silicon oxide is 0.05 μm~0.50 μm;
    wherein a specific surface area of the negative electrode active material is 1.8 $m^2$/g~5.9$m^2$/g; and
    a specific surface area of the second silicon is 4.6$m^2$/g~9.4$m^2$/g.

2. The negative electrode active material according to claim 1, wherein
    the ratio of the particle diameter Dn10 of the first silicon oxide to the particle diameter Dn10 of the second silicon oxide is 10~20; and/or
    the particle diameter Dn10 of the first silicon oxide is 1.7 μm~4.5 μm; and/or
    the particle diameter Dn10 of the second silicon oxide is 0.10 μm~0.35 μm.

3. The negative electrode active material according to claim 1, wherein a particle diameter Dn10 of the negative electrode active material is 0.10 μm~0.50 μm.

4. The negative electrode active material according to claim 3, wherein the particle diameter Dn10 of the negative electrode active material is 0.15 μm~0.36 μm.

5. The negative electrode active material according to claim 1, wherein,
    the first silicon oxide has a particle diameter distribution width of 0.8~1.2;
    and the second silicon oxide has a particle diameter distribution width of 1.0~1.6;
    wherein, the particle diameter distribution width is represented by (Dn90−Dn10)/Dn50.

6. The negative electrode active material according to claim 5, wherein,
the first silicon oxide has the particle diameter distribution width of 0.9~1.1; and/or
the second silicon oxide has the particle diameter distribution width of 1.1~1.5.

7. The negative electrode active material according to claim 5, wherein the negative electrode active material has a particle diameter distribution width of 1.0~1.5.

8. The negative electrode active material according to claim 7, wherein the negative electrode active material has the particle diameter distribution width 1.1~1.4.

9. The negative electrode active material according to claim 1, wherein
a ratio of a particle diameter Dv50 of the first silicon oxide to a particle diameter Dv50 of the second silicon oxide is 1.0~8.0;
and the particle diameter Dv50 of the first silicon oxide is 3.0 μm~15.0 μm;
and the particle diameter Dv50 of the second silicon oxide is 0.4 μm~4.0 μm.

10. The negative electrode active material according to claim 9, wherein
the ratio of the particle diameter Dv50 of the first silicon oxide to the particle diameter Dv50 of the second silicon oxide is 1.5~7.2; and/or
the particle diameter Dv50 of the first silicon oxide is 4.4 μm~11.0 μm; and/or
the particle diameter Dv50 of the second silicon oxide is 0.9 μm~3.5 μm.

11. The negative electrode active material according to claim 1, wherein a particle diameter Dv50 of the negative electrode active material is 3.5 μm~10.5 μm.

12. The negative electrode active material according to claim 11, wherein the particle diameter Dv50 of the negative electrode active material is 4.0 μm~8.5 μm.

13. The negative electrode active material according to claim 1, wherein a ratio of a specific surface area of the first silicon oxide to a specific surface area of the second silicon oxide is 1:(1.5~13.0).

14. The negative electrode active material according to claim 13, wherein the ratio of the specific surface area of the first silicon oxide to the specific surface area of the second silicon oxide is 1:(1.8~10.0).

15. The negative electrode active material according to claim 1, wherein
a specific surface area of the first silicon oxide is 0.4 $m^2/g$~3.2 $m^2/g$.

16. The negative electrode active material according to claim 15, wherein
the specific surface area of the first silicon oxide is 0.8 $m^2/g$~2.5 $m^2/g$.

17. The negative electrode active material according to claim 1, wherein the specific surface area of the negative electrode active material is 2.4 $m^2/g$~5.2 $m^2/g$.

18. A battery comprising a negative electrode plate, wherein the negative electrode plate comprises the negative electrode active material according to claim 1.

19. A device comprising the battery according to claim 18.

* * * * *